United States Patent [19]
Kato et al.

[11] Patent Number: 5,398,308
[45] Date of Patent: Mar. 14, 1995

[54] SYSTEM AND METHOD FOR IMAGE SIMULATION PERMITTING EDITING WITH COMMON DATA

[75] Inventors: Makoto Kato, Yokohama; Shinichiro Miyaoka; Makoto Nohmi, both of Kawasaki, all of Japan

[73] Assignee: Hitachi, Ltd., Tokyo, Japan

[21] Appl. No.: 945,936

[22] Filed: Sep. 17, 1992

[30] Foreign Application Priority Data

Sep. 17, 1991 [JP] Japan .................. 3-235972

[51] Int. Cl.⁶ .............................. G06F 15/62
[52] U.S. Cl. .................... 395/133; 395/131; 395/147
[58] Field of Search ........... 395/133, 135, 131, 129, 395/141, 152, 145, 147

[56] References Cited

U.S. PATENT DOCUMENTS

| | | | |
|---|---|---|---|
| 4,641,255 | 2/1987 | Hohmann | 395/135 |
| 4,730,260 | 3/1988 | Mori et al. | 395/135 |
| 4,731,743 | 3/1988 | Blancato | 395/135 |
| 4,823,303 | 4/1989 | Terasawa | 395/147 |

Primary Examiner—Almis Jankus
Attorney, Agent, or Firm—Antonelli, Terry, Stout & Kraus

[57] ABSTRACT

An image simulation method and system which is capable of preparing images in a simple way by running image editing tools without programming by a compiler language. The image simulation system includes a computer system for preparing an embedded image in a way that parts of a digital image or the image textures or patterns are embedded in any of several digital background images, with its geometrical shape deformed, or with color data changed as needed, or for preparing an image, color data of which are changed at particular portions thereof. The system further includes circuitry for changing the geometrical shape in preparing the embedded image, for changing the color data, for designating embedding positions, and for storing selection data for the image to be embedded, selection data for the background image, and control data for the images and such processes, and for reproducing the images on the basis of the data set up in advance.

14 Claims, 4 Drawing Sheets

SYSTEM AND METHOD FOR IMAGE SIMULATION PERMITTING EDITING WITH COMMON DATA

BACKGROUND OF THE INVENTION

The present invention relates to an image simulation method and system. More particularly, the present invention relates to an image simulation system that can simulate any of several articles as to the article's appearance, shape, and similar data by way of embedding of existing images, changing of their colors, or similar processes, to prepare a new embedded image.

Conventionally, there have been many applications for image simulation in which a digitally represented image (background image) can have parts of a different image (embedding image) embedded thereon or parts of the images can be changed. As an example, a scene (background image) can have only a car shown in an embedding image taken out to embed thereinto. This is described in an article of the Journal of the Institute of Electronics, Information and Communication Engineers, vol. 74, No. 4, pp. 392-397. Detailed description of such an embedding process will be given later.

The image simulation techniques can be classified into two groups with respect to their objects. The first is that of making images themselves. This is called the "image preparation" here. Image preparation comprises preparing a desired image at a high degree of freedom in a way in which various executions of features, such as position designations, geometrical changes, and color changes, are frequently repeated. This specification will not explain such image production processes. The images shown on a computer display are for general purpose.

The second group of image simulations techniques is for use in interactive presentations. As an example, such simulation can be used by a dealer at a car sales room for explanation of a car to a customer. The simulation will be available to show an appearance of the car having optional parts added different from those of the original one. It also will be available to show a color of the car different from the original one. In the second group only parts of the car are designated, with remaining ones fixed, as it is redundant to specify all the parameters, including color changes and geometrical changes. The screen should have information needed to introduce the car, particularly in explanation of the car at the shop, without unnecessary data.

The present invention is direct to an image simulation system for such a presentation in the second group mentioned above.

It is common in setting up the prior art image simulation systems for presentation to design a screen for each of applications and to prepare a program with use of a compiler language, such as the C language. Alternatively, general-purpose basic modules for geometrical manipulation and color change are arranged for efficient use before being combined together in coding.

On the other hand, there has been proposed a system called the AVS (Application Visualization System) by Stardent Inc., US, an object of which is to process images, although it is in a field apart from image simulation. This system has a network editor that can show on its screen rectangular block to represent ones corresponding to the basic modules mentioned above. These are selectively connected together on the screen to prepare an image processing program. That is, programming can be done by manipulation only on the screen, without coding by the compiler language. To accomplish features which are not prepared by the basic modules, however, new modules have to be defined by coding with use of the compiler language. This was described in an article of the Eizo Joho, Vol. 1, pp. 51-57, 1991.

There have been many disclosures or products for information retrieval systems in view of recent hypermedia. A typical one is a system in which buttons and icons may be defined on its screen, and any of them may be picked for a desired operation. Designation of the buttons and the icons can be made on the screen by use of a mouse or a simple language. The system is much simpler than one which uses a compiler language. However, to accomplish features other than prearranged ones, such as movement of a page, it also is necessary to prepare and input modules coded by the compiler language. The system was described, for example, in an article of the Bit, Vol. 20, No. 2, pp. 174-180, 1988.

In turn, the following describes an embedding process for digital images which is a typical one of image simulation in detail.

(1) Preparing background images and embedding images. For example, the background images include a landscape, and the embedding images are cars.

(2) Separating areas (called the masks) in which images are embedded. For example, only a portion of the car is cut out.

(3) To embed the area cut out of the embedded image onto the background image, the following operations are made.

a. Designating an Embedding Position

Let $A(i, j)$ indicate a component of the background image on column i and line j, $B(i, j)$ indicate a component of the embedding image on column i and line j, and $C(i, j)$ indicate a component of the embedded image on column i and line j. Assume each of the images to be in color, with the components being the three components red, green, and blue. Let the three components of $A(i, j)$, for example, be indicated by $Ar(i, j)$, $Ag(i, j)$, and $Ab(i, j)$. In general, designation of an embedding position is made in such a way that a pixel of the embedding image is designated at a desired portion of the background image. If $B(i1, j1)$ is to be embedded at $A(i0, j0)$, for example, i1, j1, i0, and j0 should be designated.

b. Designating an Expansion or Reduction Ratio

In most cases, the embedding image will not fit with the background image if the former is embedded on the latter. For this reason, the embedding image has to be expanded or reduced properly. In order to multiply the embedding image by a, for example, the following equations are used.

Outside the mask, $$C(i0+i, j0+j) = A(i0+i, j0+j) \tag{1a}$$

Inside the mask, $$C(i0+i, j0+j) = B'(i1+i/a, j1+j/a) \tag{1b}$$

where $B'(x, y)$ is an interpolation function for pixels around the embedding image and x and y are not integers. A typical bilinear interpolation is given by $$B'(x, y) = ([x] + 1 - x)([y] + 1 - y)B([x], [y]) + \\ ([x] + 1 - x)(y - [y])B([x], [y] + 1) + \\ (x - [x])([y] + 1 - y)B([x] + 1, [y]) + \\ (x - [x])(y - [y])B([x] + 1, [y] + 1) \quad (2)$$

where [x] is a Gaussian symbol which is an integer not exceeding x.

c. Adjusting a Hue of the Cut-Out Area

In general, the background image and the embedding image are different in hue, as they were shot under different sun shine and lighting conditions. This causes a sense of incompatibility if the image to be embedded is superimposed on the background image as it is. For the reason, gradations of the embedding or background image have to be changed to adjust the hue. The three components of red, green, and blue, as described previously, are represented by 256 gradations from 0 to 255, 16.70 million colors in total. The gradation conversion is made by a conversion function with domains and ranges of 0 to 255. Let Fr, Fg, and Fb be the conversion functions, and C' be a pixel after the conversion.

Inside the mask, $$Cr'(i,j) = Fr(Cr(i,j)) \quad (3a)$$

Outside the mask, $$Cr'(i,j) = Cr(i,j) \quad (3b)$$

Similarly, the gradation conversions for the green and blue colors can be made.

The designation of embedding position, the designation of expansion or reduction ratio, and the adjustment of hue of cutout area are usually made in an interactive way.

Typical image simulations include change of colors and textures (called the texture mapping) on particular portions, such as a body of the car, in the image. The change of colors can be made in the same way as the adjustment of hue with use of Eq. 3 except that the change of colors should be made to different colors on the basis of the theory of color, while the adjustment of hue is to change brightness and contrast.

More detailed descriptions of the image simulation were made in the disclosures in the US filing No. 07/549086, 07/493447, and 07/796313 by the applicant.

The conventional methods described above involve the following problems in making up the image simulation system for presentation.

Firstly, the method of using the compiler language is complicated, as the programming has to be made from the beginning if the application is changed in building up the image simulation system.

Secondly, the network editor of the AVS cannot make an interactive process with designation of an object in the image without input of the modules prepared by use of the compiler language, although it can repeat a routine process of an image space filter combined with a threshold treatment. It, for example, cannot interactively designate a different process for the input object in the image.

Finally, the HyperCard cannot process any image except simple animations, as it is to chiefly serve for information retrieval, such as page alignment.

SUMMARY OF THE INVENTION

In view of the foregoing, it is an object of the present invention to provide an image simulation method and system capable of image simulation in a simple way, with use of image editing tools without programming by a compiler language, thus resolving the problems in the conventional techniques.

Briefly, the foregoing object is accomplished in accordance with aspects of the present invention by an image simulation system comprising in combination: a computer system for preparing an embedded image in a way that parts of a digital image, or any of textures or patterns, are embedded in any of digital background images, with its geometrical shape deformed or color data changed as needed, or for preparing an image, color data of which are changed at particular portions thereof; means for changing the geometrical shape in preparing the embedded image, changing the color data, designating embedding positions, and storing selection data for the image to be embedded, selection data for the background image, and control data for the images and such processes; and, means for reproducing the images on the basis of the data set up in advance.

In the image simulation system according to the present invention, an image editor can store data representing a method of geometrical change, data for color change, and embedding position data in advance that are interactively determined. It can define operations, such as the geometrical change, as a button is picked. A fixed-form simulator can play back the simulation on the basis of the stored data as any of the defined button is picked. These, of course, do not include coding by a compiler language.

In other words, the image simulation system according to the present invention separates the image editor for interactively preparing an image in the image simulation from the fixed-form simulator for playback of it, defines a common data structure for making both, stores the operation of the image editor in the data structure, and has a playback section for reproduction. The image editor defines features of keys for the buttons in the fixed-form simulator. The image simulation system has a means of common basic module for the image editor and the fixed-form simulator to selectively make either of the image editor or the fixed-form simulator operate in the respective modes. It is not limited to the means.

BRIEF DESCRIPTION OF THE DRAWINGS

The present invention may be more fully described by reference to the accompanying drawings in which.

DESCRIPTION OF THE PREFERRED EMBODIMENTS

The following describes in detail a preferred embodiment according to the present invention for an image simulation method and system, by reference to FIGS. 1 to 7. The embodiment is to prepare a fixed form simulation for background embedding of a car and change of the car body color in order to make a sales promotion of the car.

Figure 2:
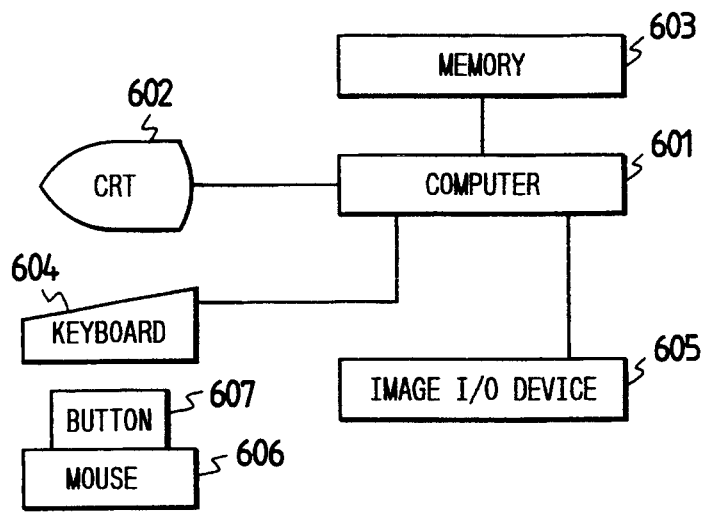
FIG. 2 is a hardware configuration for an image simulation system as an embodiment of the present invention.

FIG. 2 is a hardware configuration for an image simulation system as the embodiment of the present invention. The image simulation system comprises a computer 601, a memory 603 for storing digitalized images, a CRT 602 for displaying a color image and/or characters, an image I/O device 605 for entering a photograph as digital image and feeding out the image for printing, a keyboard 604, and a mouse 606 with a button 607.

The mouse 606 functions as follows. A small arrow is indicated at a position on the CRT 602 and is directed by the mouse 606 with a control program in the computer 601. An operator can move the arrow to a desired position on the CRT 602 by moving the mouse 606. If he or she presses the button 607 on the mouse 606, position data at the position pointed to by a tip of the arrow are sent to the computer 601 for use according to software. This operation is hereinafter referred to as the "picking".

With respect to the quality of the image on the CRT 602, the embodiment has a generally available capability that permits 256 gradations for each of the red, blue, and green colors, 16.70 million colors in total, with one million pixels of 1,000 lines by 1,000 columns per screen. It however shall not be limited to that quality. The image I/O device 605 used is available for that quality.

Figure 1:
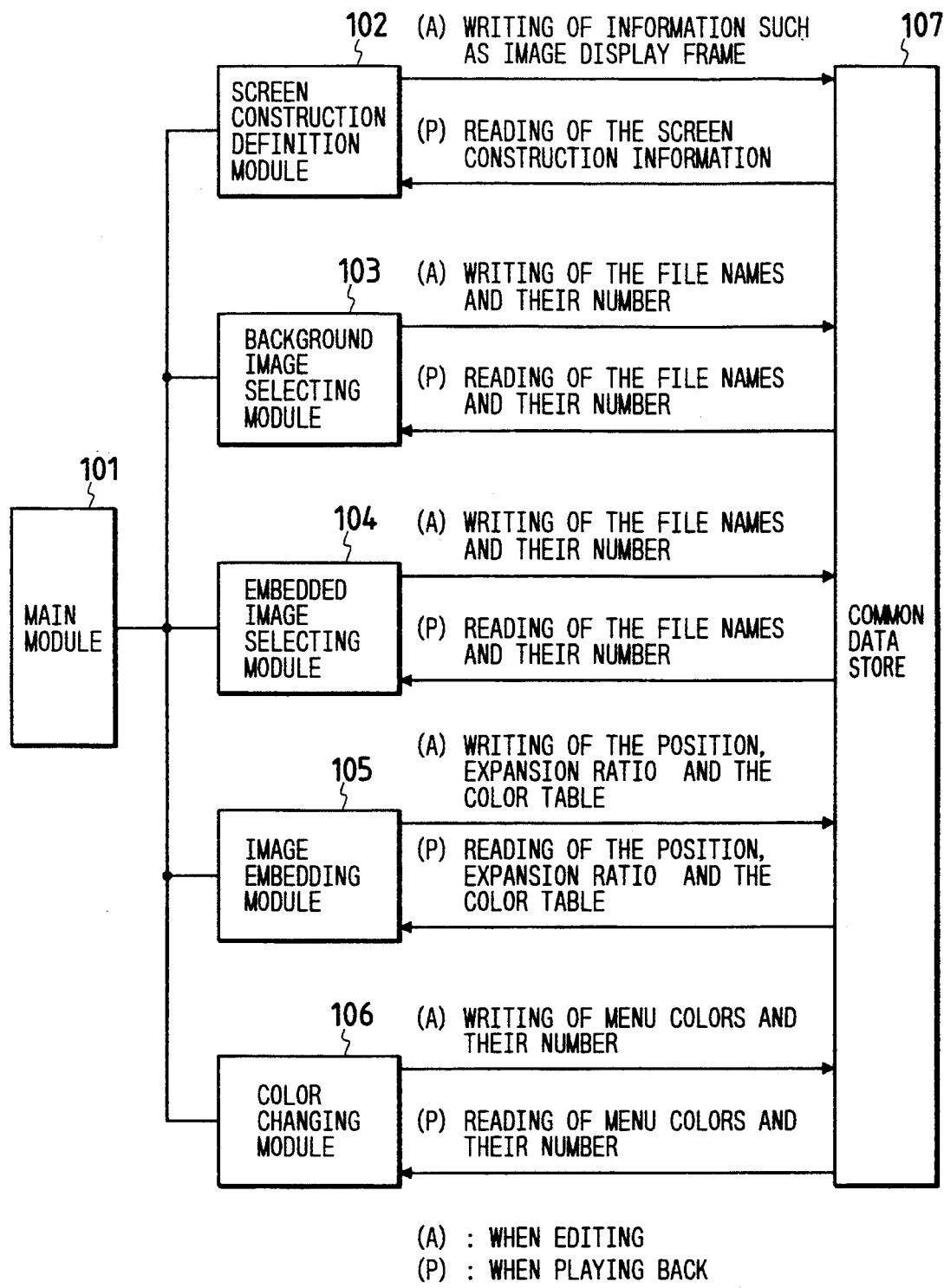
FIG. 1 is a module configuration for software of an embodiment according to the present invention.

The image simulation system of the present invention uses a software module configuration as shown in FIG. 1. The system uses a process in which image editing and fixed-form simulation are made by a common basic module, as described previously. In the present invention, the basic modules can include any of several desired features, but should be capable of basic operations for image simulation. The embodiment comprises a main module 101, an image defining module 102, a background image selecting module 103, an embedding image selecting module 104, an image embedding module 105, and a color changing module 106. The invention, however, is not limited to those modules.

In the embodiment, mode selection of the image editing or fixed-form simulation is made by entering an external parameter at the time of start. It, however, shall not be limited to that method. Data, as shown in FIG. 1, are written in a common data store 107 in editing or read from it in fixed-form simulation, depending on the parameter.

The modules are described in detail below.

(0) Main Module 101

Controls the functional modules. Describes a story for the fixed-form simulation.

(1) Image Defining Module 102

In editing: Designates and writes an image display frame, a button display frame, or similar data in the common data store 107. In playback: Displays the designated image as directed by the common data in store 107. Common data: Image display frame position data and button display frame data.

(2) Background Image Selecting Module 103

In editing: Looks up images available in the computer system, and writes into the common data store 107 file names and quantities of the background images to be used. Similarly, looks up and writes images to be embedded into the common data in store 107. In playback: Scales down and indicates the images designated by the common data in store 107 as a menu. Returns the file name of the image selected from the menu to the main module 101. Common data: Quantity and names of background image files.

(3) Embedding Image Selecting Module 104

In editing: Looks up images available in the computer system, and writes into the common data store 107 file names and quantities of the images to be embedded. In playback: Scales down and indicates the images designated by the common data in store 107 as a menu. Returns the file name of the image selected from the menu to the main module 101. Common data: Quantity and names of embedding image files.

(4) Image Embedding Module 105

In editing: Changes position, size, and hue of an image before embedding it into the background image. Writes a final embedding position, expansion ratio, and color change table into the common data in store 107. In playback: Embeds an image into the background image as directed by the common data in store 107. Common data: Embedding position, expansion ratio, and color change table.

(5) Color Changing Module 106

In editing: Mixes colors and simulates color change before writing menu color data and their quantity into the common data store 107. In playback: Indicates menu colors of the common data in a menu, and changes the color selected. Common data: Menu colors and their quantity.

Figure 3:
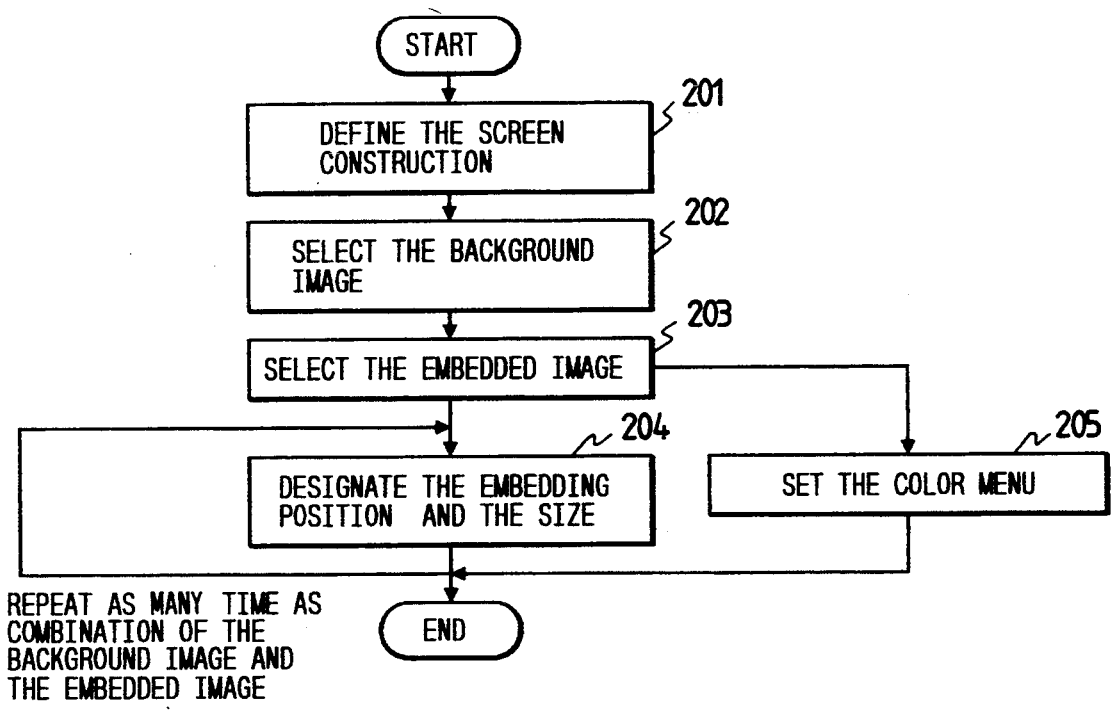
FIG. 3 is a flow chart for image editing in accordance with the embodiment.
Figure 4:
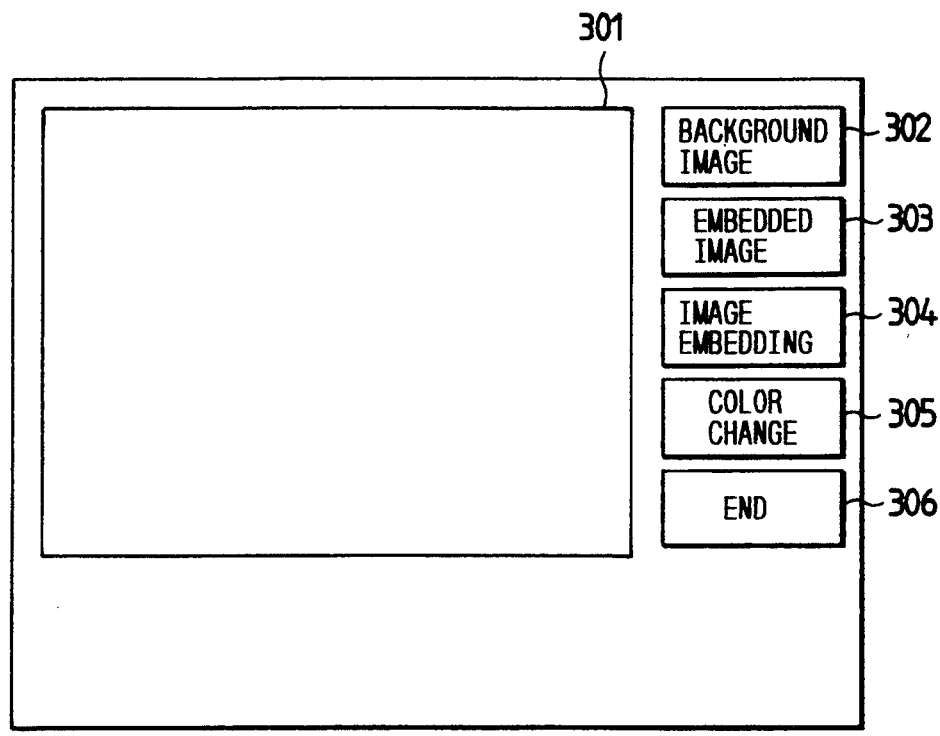
FIG. 4 is a screen view for illustration of the process of the embodiment.
Figure 5:
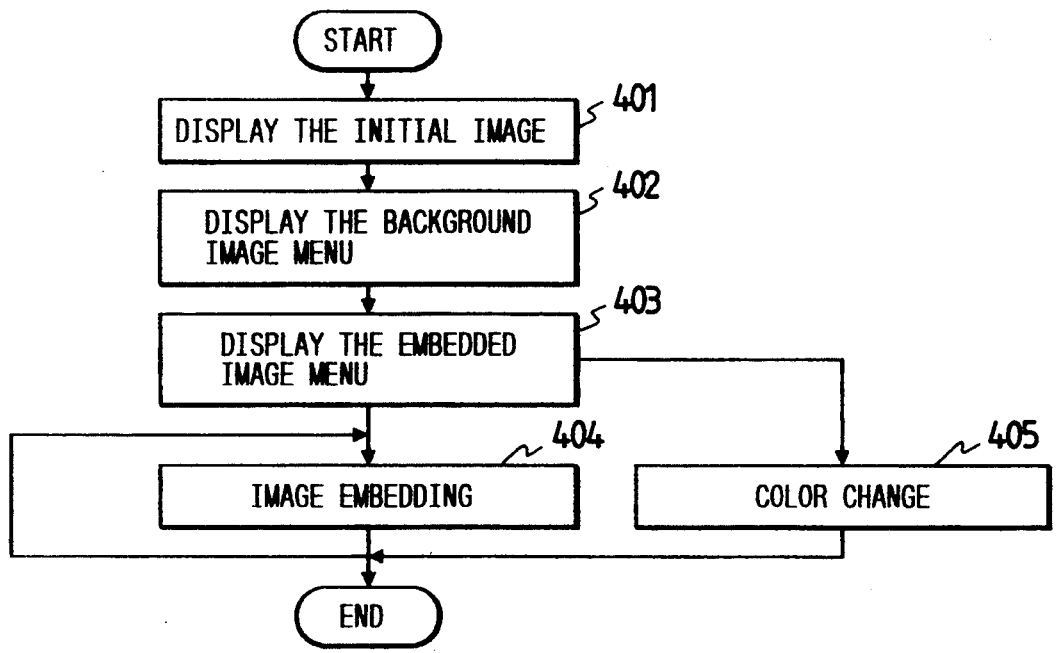
FIG. 5 is a flow chart for a playback fixed-form simulation of the embodiment.
Figure 6:
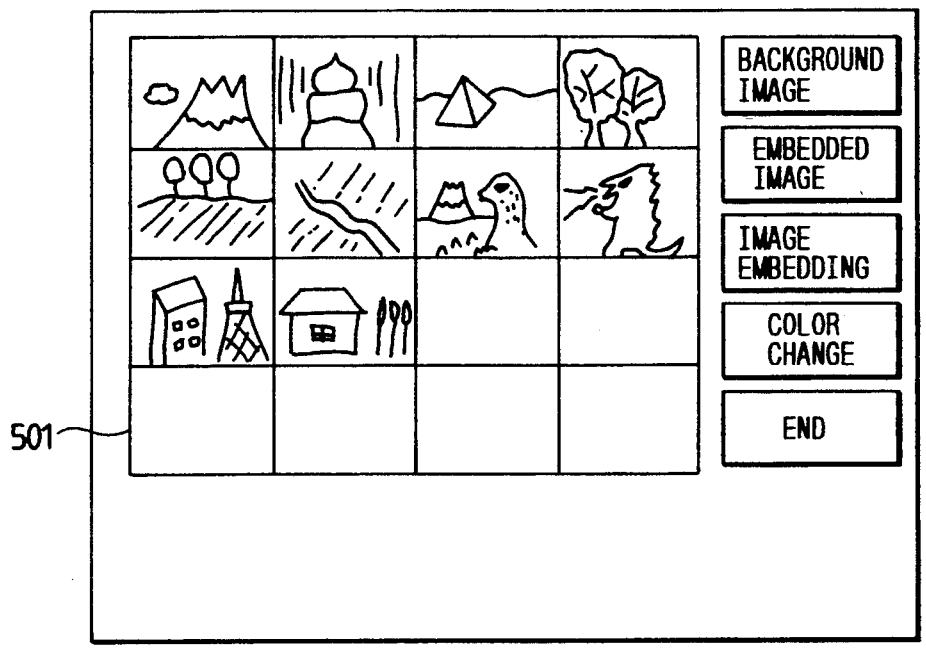
FIG. 6 depicts background images for illustration of the process of the embodiment.
Figure 7:
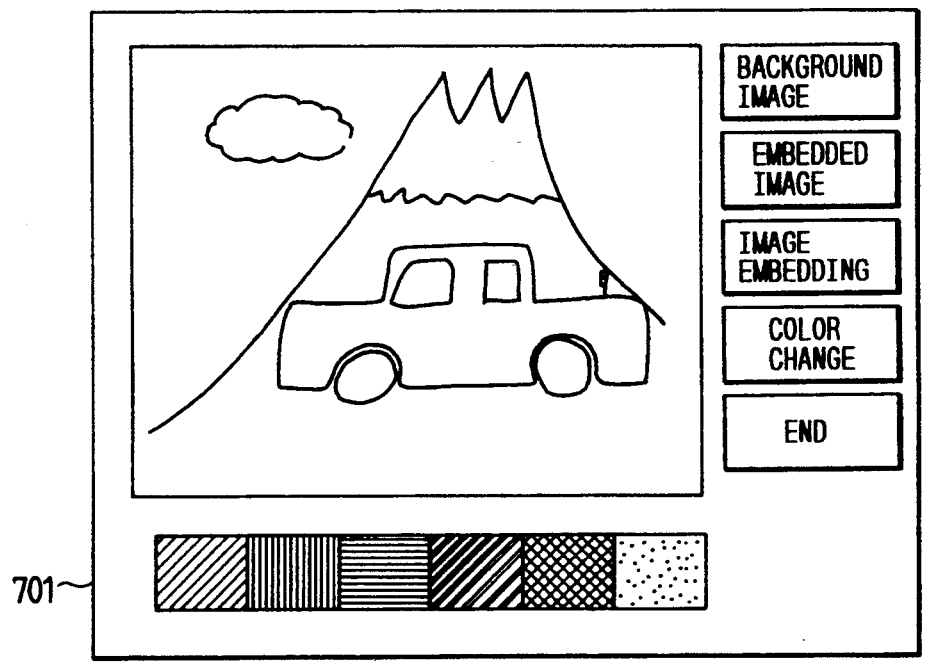
FIG. 7 is a screen view for illustration of the process of the embodiment.

FIGS. 3 and 5 show flow charts for the embodiment of image embedding. FIG. 3 is the flow chart for the image editing. FIG. 5 is the flow chart for the playback fixed-form simulation. The image editing and playback fixed-form simulation are chiefly done by the computer 601 shown in FIG. 2. These processes use the same program in different modes.

First, the image editing shown in FIG. 3 is described below. Step 201 defines screen construction. This can be made by defining an image display frame 301 and buttons 302 through 306 shown in FIG. 4. By picking the button 302, control goes to step 202. This step prepares the menu of background images, designates any of the file names existing in the memory 603, and counts the quantities of the files designated. After the end of that step, control returns to the screen shown in FIG. 4. By picking the button 303, control goes to step 203 for selection of an image to be embedded. This step also designates any of the file names existing in the memory 603, and counts its quantity. After the end of that step, control returns to the screen shown in FIG. 4.

By picking the button 304, control goes to step 204. This step embeds desired images in the background image. In the embodiment, the main module 101 controls all the combinations of the background images selected in step 202 and written in the common data stores 107 and the embedding images selected in step 203 and written in the common data store 107. The main module 101 also controls step 205. Masking the images to be embedded is on the assumption that all the images were cut out in advance. Embedding the images is made in the process described previously and at the same time, the embedding position and the expansion or reduction ratio are written in the common data store 107. After the end of that step, control returns to the screen in FIG. 4.

By picking the button 305, control goes to step 205. This step sets a color menu. Basic color data to be set include values of red, green, and blue. The color changing module 106 has features for mixing the colors and changing a color on the basis of the mixed color as disclosed in the US filing No. 07/493447. The color data and the quantity of the mixed and finally selected menu colors are written in the common data store 107. After the end of that step, control returns to the screen in FIG. 4. By picking the button 306, the image editing ends. As a result, the common data needed for the fixed-form simulation have all been written in a file.

In turn, the fixed-form simulation is described below. Before starting the fixed-form simulation, the mode and the common data file are designated. Step 401, 10 shown in FIG. 5, causes display of an initial image of the fixed-form simulation which appears the same as in FIG. 4. By picking the button 302, control goes to step 402. This causes display of a small image menu 501 for the background images stored in the common data store 107. The small image menu 501 (FIG. 6) is displayed within the image display frame 301. By picking any one of the small images with the mouse, the desired small image can be selected. After the end of that step, control returns to the screen in FIG. 4.

By picking the button 303, control goes to step 403. This step permits selection of any of the images to be embedded. Another small image menu is displayed to permit selection of a desired image as in step 402. After the end of that step, control returns to the screen in FIG. 4. By picking the button 304, control goes to step 404. This step embeds the image in the background image according to the embedding position, the expansion ratio, and color change table in the common data in store 107. After the end of that step, control returns to the screen in FIG. 4.

By picking the button 305, control goes to step 405. This step causes display of a color menu shown in FIG. 7. If a desired color is picked from the color menu, the color is changed to that color. After the end of that step, control returns to the screen in FIG. 4. By picking the button 306, the image simulation ends.

The embodiment described so far has the advantage of providing on image simulation system in which fixed-form image simulation can be done with simple selection. This is due to the fact that the same program can be executed in either of the different modes, the image editing and fixed-form simulation modes.

While the principles of the invention have been described above in connection with a specific embodiment, it is to be clearly understood that this description is made only by way of example and not as a limitation on the scope of invention.

As described in detail so far, the present invention provides an outstanding effect in that it can accomplish fixed-form image simulation with simple selection as the image editing tool is run without any programming by a compiler language.

What is claimed is:

1. For performance on an image simulation system having input/output means, processor means, and storage means, an image simulation method comprising the steps of:
   (a) activating said input/output means to designate editing of a target image, including at least one of shape deformation, color change, and partial color change of an image in the target image;
   (b) activating said processor means to perform the designated editing by means of a fixed-form simulation using common data stored in said storage means, the common data including procedure data for performing editing of a specific image by at least one of shape deformation, color change, and partial color change in the specific image;
   (c) outputting an edited target image resulting from the editing;
   (d) storing procedure data used in the editing in said storage means as new common data; and
   (e) performing fixed-form simulation to reproduce a simulation on the basis of the new common data.

2. An image simulation method according to claim 1, wherein step (b) includes performing the designated editing in a fixed-form simulation mode.

3. An image simulation method according to claim 1, wherein the target image includes a background image and an embedding image embedded in said background image, and the editing is performed on the embedding image.

4. An image simulation method according to claim 3, further comprising selecting the background image from a plurality of background images stored in advance in said storage means.

5. An image simulation system comprising:
   (a) input/output means for designating editing of a target image, including at least one of shape deformation, color change, and partial color change of an image in the target image;
   (b) storage means for storing common data including procedure data for performing editing of a specific image by at least one of shape deformation, color change, and partial color change in the specific image;
   (c) processor means for performing the designated editing by means of a fixed-form simulation using the common data stored;
   (d) output means for outputting an edited target image resulting from the editing;
   (e) means for storing procedure data used in the editing in said storage means as new common data; and
   (f) means within said processor means for performing fixed-form simulation to reproduce a simulation on the basis of the new common data.

6. An image simulation system according to claim 5, wherein said processor means includes means for performing the designated editing in a fixed-form simulation mode.

7. An image simulation system according to claim 5, wherein the target image includes a background image and an embedding image embedded in said background image, and wherein said processor means performs the editing on the embedding image.

8. An image simulation system according to claim 7, further comprising means for selecting the background image from a plurality of background images stored in advance in said storage means.

9. For performance on an image simulation system having input/output means, processor means, and storage means, an image simulation method comprising the steps of:
- (a) activating said input/output means to designate editing of a target image, including at least one of shape deformation, color change, and partial color change of an image in the target image, the designating including designating of procedure data for at least one of the shape deformation, color change, and partial color change of the image in the target image;
- (b) activating said processor means to perform the designated editing by designated procedure data;
- (c) outputting an edited target image resulting from the editing;
- (d) storing procedure data used in the editing in said storage means for a fixed-form simulation;
- (e) repeating steps (a) to (d) to store procedure data for a plurality of fixed-mode simulations in said storage means; and
- (f) selecting data for one of said fixed-mode simulations to again activate said processor means to reproduce a fixed-mode simulation on the basis of the selected procedure data.

10. An image simulation method according to claim 9, wherein the target image includes a background image and an embedding image embedded in said background image, and the editing is performed on the embedding image.

11. An image simulation method according to claim 10, further comprising selecting the background image from a plurality of background images stored in advance in said storage means.

12. An image simulation system comprising:
- (a) input/output means for designating editing of a target image, including at least one of shape deformation, color change, and partial color change of an image in the target image, by designating procedure data for at least one of shape deformation, color change, and partial color change of the image in the target image;
- (b) processor means for performing the designated editing by using designated procedure data;
- (c) output means for outputting an edited target image resulting from the editing;
- (d) memory means for storing procedure data used in the editing as data for a fixed-form simulation and for storing procedure data resulting from repeated operation of elements (a) to (c) as procedure data for a plurality of fixed-mode simulations; and
- (e) means for selecting data for one of said fixed-mode simulations to reproduce a fixed-mode simulation on the basis of the selected procedure data upon activating of said processor means again.

13. An image simulation system according to claim 12, wherein the target image includes a background image and an embedding image embedded in said background image, and wherein said processor means performs the editing on the embedding image.

14. An image simulation system according to claim 13, further comprising means for selecting the background image from a plurality of background images stored in advance in said storage means.

* * * * *